United States Patent [19]
>
> Burrows

[11] Patent Number: 4,585,554

[45] Date of Patent: Apr. 29, 1986

[54] COMBINED PURIFIED WATER DISPENSING DEVICE AND REJECT WATER CONTROL DEVICE

[76] Inventor: Bruce D. Burrows, 363 Orizaba St., Long Beach, Calif. 90814

[21] Appl. No.: 573,155

[22] Filed: May 1, 1984

Related U.S. Application Data

[63] Continuation-in-part of Ser. No. 457,763, Jan. 13, 1983, abandoned, which is a continuation of Ser. No. 295,696, Aug. 24, 1981, abandoned.

[51] Int. Cl.$^4$ .............................................. B01D 31/00
[52] U.S. Cl. ..................... 210/110; 210/129; 210/195.2; 210/257.2; 210/433.2
[58] Field of Search ............... 210/110, 129, 195.2, 210/257.2, 261, 262, 266, 295, 321, 433.2; 137/599.1, 625.18, 625.27; 457/763

[56] References Cited

U.S. PATENT DOCUMENTS

| | | | |
|---|---|---|---|
| 2,954,799 | 10/1960 | Kryzer et al. | 137/599.1 |
| 3,089,513 | 5/1963 | Kirk, Jr. | 137/593 |
| 3,568,843 | 3/1971 | Brown | 210/258 X |
| 3,719,593 | 3/1973 | Astil | 210/258 X |
| 3,773,076 | 11/1973 | Smith | 137/625.19 |
| 3,831,757 | 8/1974 | Gossett et al. | 210/257.2 X |
| 3,967,638 | 7/1976 | Tondreau | 137/216 |
| 4,021,343 | 5/1977 | Tyler | 210/110 |
| 4,176,063 | 11/1979 | Tyler | 210/257.2 X |
| 4,210,533 | 7/1980 | Astl | 210/136 |

Primary Examiner—David Sadowski
Attorney, Agent, or Firm—William C. Babcock

[57] ABSTRACT

A purified water dispensing and reject water control device that when operatively associated with a pressurized feed water supplied reverse osmosis cartridge that has purified water and reject water outlets and a tank that is subdivided by a movable barrier into first and second compartments of variable volume that receive purified and reject water and may have same discharged therefrom. The control device includes a single elongate tubular member that actuates first and second valve members that tend to remain in first positions. Purified water from the purified water outlet flows to the first compartment and reject water from reject water outlet flows through a first flow restrictor and then through a second flow restrictor defined by the tubular member to the drain when the valve members are in first positions. When the tubular member and first and second valve members are moved to second positions reject water substantially by-passes the first and second flow restrictors to flow to the second compartment to expand the same and force purified water from the first compartment through an elongate passage partially defined by the elongate tubular member to a dispensing outlet. When the elongate tubular member and first and second valve members return to first positions, dispensing of purified water is terminated, and the flow thereof directed to the first compartment to expand the same and displace reject water from the second compartment. The displaced reject water enters the control device to flow through the second flow restrictor to the drain.

7 Claims, 8 Drawing Figures

COMBINED PURIFIED WATER DISPENSING DEVICE AND REJECT WATER CONTROL DEVICE

CROSS REFERENCE TO RELATED APPLICATIONS

The present application is a continuation-in-part of Ser. No. 457,763, filed Jan. 13, 1983, now abandoned, which was a continuation of Ser. No. 295,696 filed Aug. 24, 1981, now abandoned, which was a substitute of Ser. No. 087,881, filed Oct. 24, 1979, now abandoned, which was a continuation of Ser. No. 4,652, filed Jan. 19, 1979, now abandoned, which was a continuation of Ser. No. 867,363, filed Jan. 6, 1978, now abandoned.

BACKGROUND OF THE INVENTION

1. Field of the Invention

This invention relates to a combined purified water dispensing device and reject water control device.

2. Description of the Prior Art

In the past few years, reverse osmosis assemblies have been developed that may be placed under a sink. The assembly includes a reverse osmosis module and an elongate tank, which tank has the interior subdivided into a lower compartment of variable volume that receives purified water, and an upper compartment that may have reject water discharged therein to increase the volume thereof to force purified water therefrom through a suitable dispensing spout.

Such prior art devices have suffered from numerous operational deficiencies. In some such water purifiers as disclosed and claimed in Tyler U.S. Pat. No. 4,021,343 that issued May 3, 1977 an extremely complicated set of valves, sensors and conduits are required to control the flow of feed water to the reverse osmosis module, and feed water and reject water to the dispensing spout and drains. Not only is such a water purifier expensive, but due to the complexity of the valves small grains of foreign material may render the same inoperative, and preclude operation of the water purifier until the malfunctioning valve is repaired.

Others of the prior art water purifiers have the operational disadvantage that an installation requires a separate manually operated water dispensing valve and a separate reject water discharge assembly closely associated with a sink that is unsightly in appearance. Yet other of the prior art water purifiers discharge purified water from the reservoir therefor to the drain, after the reservoir has become filled with purified water, which, of course is a waste of water.

A major object of the present invention is to provide a device that may be mounted in a single transverse bore in a drain board adjacent a sink to dispense purified water as desired, and so control reject water that it may flow through a first and a second flow restrictor and an air gap to the drain when purified water is not being dispensed. Whem a rigid actuating tubular member is moved downwardly upper and lower valve members that control the flow of purified water and reject water being moved from upper and lower seats to allow flow of purified water from a lower first compartment of variable volume as reject water is discharged to an upper second compartment of variable volume, with excess water that tends to flow to the upper second compartment flowing upwardly through the tubular member that acts as a second flow restrictor to the drain; the actuating member when returned to an up position seating said first and second valve members, with reject water in said second upper compartment being forced therefrom by purified water flowing to the lower first compartment to expand the latter, and the water flowing from the upper second compartment entering the tubular member to flow upwardly therein and discharge through the air gap to the drain.

Another object of the invention is to provide one in which the flow of reject water to the reverse osmosis module is throttled to a reduced rate as the purified water holding compartment approaches its maximum volume, and one that can be manually modified to terminate such flow of throttled reject water when the lower first compartment has filled with purified water.

A still further object of the invention is to supply one that embodies a vertically movable tubular member that when moved downwardly unseats purified water and reject water controlling valve members, with the reject water valve member serving as a first flow restrictor, and a tubular member as a second flow restrictor.

SUMMARY OF THE INVENTION

The present invention is a purified water dispensing and reject water control device that is capable of being mounted in a single transverse bore in a drain board adjacent a sink. The control device is used in combination with a reverse osmosis module having an internal membrane, which module is in communication with a source of pressurized feed water. The module has a purified water outlet and a reject water outlet. In addition, a tank is provided that has a transverse movable barrier therein that subdivides the interior of the tank into first and second compartments of variable volume. The lower first compartment contains stored purified water, and the upper second compartment after purified water has been dispensed from the tank will contain reject water.

The control device of the present invention includes a lower assembly, an intermediate assembly, and an upper assembly, all of which are removably connected together, with the intermediate assembly being disposed in the drilled bore hole in the drain board adjacent the sink. The lower assembly includes an elongate hollow valve body, that has a transverse partition therein that subdivides the interior of the valve body into an upper confined space and a lower confined space that have upper and lower valve seats defined therein. Upper and lower valve members in the upper and lower confined spaces have upper and lower spring means associated therewith that tend to maintain the upper and lower valve members in sealing engagement with the upper and lower valve seats. The lower valve member has a cavity extending downwardly therein, which cavity has a bottom, and a groove is defined in the external surface of the lower valve member that cooperates with the lower valve seat to define a first flow restrictor. A purified water inlet in the valve body is in communication with the upper confined space. A longitudinal passage is provided in the valve body partition that extends between the lower valve seat and the upper confined space. A transverse passage is formed in the partition that is in communication with the longitudinal passage. A reject water inlet is in communication with the lower confined space. An elongate tubular member that has upper end and a lower end and an external diameter less than that of the cavity is provided, with the lower end of the tubular member in contact with the bottom of the cavity. The elongate tubular member extends upwardly from the bottom of the cavity through the longitudinal passage to a position above the drain board. The tubular member supports the upper valve member at a fixed position thereon. A resilient seal is provided in the longitudinal passage that slidably engages the tubular member.

The intermediate assembly includes an elongate first body that extends through the bore in the drain board and has an upper end disposed above the drain board and a lower end situated therebelow that removably supports the lower assembly. The elongate first body has a longitudinal bore defined therein through which purified water may flow and through which longitudinal bore the elongate tubular member extends upwardly. The intermediate assembly includes a tubular reject water drain line that extends outwardly therefrom and is situated below the drain board. A reject water passage in the elongate body is in communication with the drain line and an upwardly extending passage through which reject water may flow downwardly by gravity.

The upper assembly rests on the drain board and includes a second body that is secured to the upper end of the first body. An inverted J-shaped purified water dispensing tube is secured to the second body and is in communication with the purified water passage defined in the second body that establishes communication between the bore and the second assembly and the water dispensing tube. A spring loaded member is mounted on the second body that at all times tends to remain in an up position, and has an upper end of the tubular member in abutting contact therewith. A recess is formed in the second body into which reject water may flow through an air gap by gravity from the upper end of the tubular member to subsequently flow through a reject water passage to the drain line that projects from the intermediate assembly.

A first conduit connects the purified water outlet of the reverse osmosis module to the first compartment and to the purified water inlet in the valve body of the lower assembly. A second conduit connects the reject water outlet of the reverse osmosis module to the reject water inlet in the valve body of the lower assembly.

A third conduit connects a transverse passage in the valve body of the lower assembly to the second compartment. The first and second compartments after initial dispensing of purified water from the first compartment are filled with purified water and reject water.

The upper and lower valve members when in engagement with the upper and lower valve seats cause purified water to flow through the first conduit to the lower first compartment to increase the volume thereof. As the volume of the first compartment increases reject water in the upper second compartment is forced outwardly through the third conduit into the transverse and longitudinal passages in the partition of the valve body of the lower assembly to enter the elongate tubular member and discharge from the upper end thereof through the air gap into the recess to flow by gravity to the drain line that extends outwardly from the intermediate assembly. Reject water from the reject water outlet in the reverse osmosis module flows through the second conduit into the lower confined space to flow through the first flow restrictor to the longitudinal passage to enter the lower end of the elongate tubular member and flow upwardly therethrough to discharge from the upper end thereof and after falling by gravity through the air gap flow into the recess to discharge downwardly through a passage to the drain line that projects outwardly from the intermediate assembly.

The spring loaded member when moved downwardly moves the elongate tubular member downwardly to separate the upper and lower valve members from the upper and lower valve seats. The major portion of the pressurized feed water now flows rapidly through the reverse osmosis module to flush foreign material from the membrane therein and then flow through the second conduit to the lower confined space and then flow through the transverse passage and third conduit into the upper second compartment to enlarge the volume thereof and transfer a force through the barrier to the purified water in the lower first compartment that is sufficient in force to cause the purified water to flow through the first conduit to the purified water inlet and then flow upwardly in the bore in the intermediate assembly to discharge from the dispensing tube in the upper assembly.

The elongate tubular member acts as a second flow restrictor to allow reject water flowing into the lower confined space to flow upwardly through the tubular member to discharge from the upper end thereof into the air gap and fall by gravity to the recess from which it discharges downwardly by gravity through the intermediate assembly to the drain line that extends outwardly therefrom. The spring loaded member when allowed to return to the up position permits the spring loaded upper and lower valve members to engage the upper and lower valve seats. Purified water again starts flowing to the lower first compartment from the reverse osmosis module to enlarge the volume of the first compartment. As the volume of the lower first compartment increases, reject water from the upper second compartment is forced therefrom to enter the lower assembly through the transverse passage therein and then flow upwardly through the elongate tubular member to discharge through the air gap to the recess in the upper assembly and then flow to the drain line.

By throttling the flow of pressurized feed water to the reverse osmosis module as the volume of purified water in the lower first compartment increases the volume thereof to the extent that it is substantially filled, and utilizing a spring loaded valve in the lower assembly through which the throttled reject water must flow, the flow of reject water to the drain may be terminated, due to the throttled reject water being of such low pressure and volume as not to be able to maintain the spring loaded valve in an open position. When the spring loaded valve assumes a closed position, further discharge of reject water from the reverse osmosis module to the drain line in the intermediate assembly is terminated.

From the above described it will be apparent that the control device of the present invention permits operation of a reverse osmosis assembly with a minimum wastage of reject water, and purified water at no time being wasted by discharge to the drain after the purified water holding lower first compartment has been completely filled with purified water.

DESCRIPTION OF THE PREFERRED EMBODIMENTS

Figure 8:
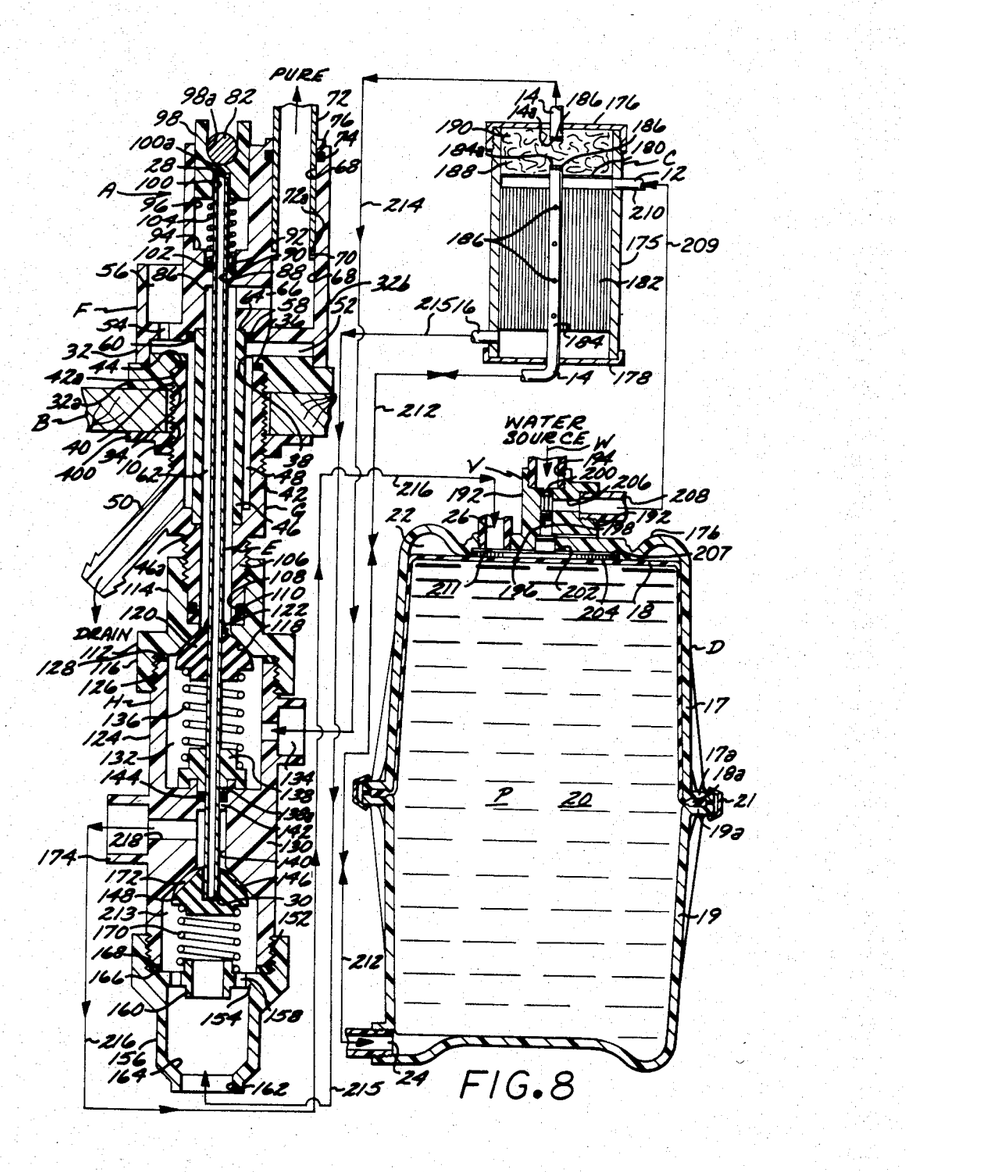
FIG. 8 is a longitudinal cross sectional view of the invention and schematically illustrating how it is operatively associated with a reverse osmosis module connected to a source of pressurized water, and an elongate tank that has a transverse movable barrier therein that subdivides the interior of the tank into first and second compartments, with the lower first compartment serving to store purified water and the upper second compartment serving to have reject water discharged therein, and under certain conditions in sufficent volume as to pressurize the purified water in the lower first compartment so that it will be dispensed from the invention.

The purified water dispensing device and reject water controlling device A as may best be seen in FIG. 8 may be mounted in a single transverse vertical bore 10 formed in a drain board B adjacent a sink (not shown). A reverse osmosis module C is provided as shown in FIG. 8 that has a pressurized feed water inlet 12, a purified water outlet 14 and a reject water outlet 16.

A tank D is provided that has a cup shaped resilient transverse barrier 18 situated therein, which barrier has a circular lip 18a extending outwardly therefrom. The tank is defined by an upper cup shaped half 17 and lower cup shaped half 19, which have flanges 17a and 19a projecting outwardly therefrom, that grip a lip portion 18a of the barrier therebetween, when a channeled shape band 21 is tightened (by means not shown) to force the flanges 17a and 19a together. The barrier 18 serves to subdivide the interior of the tank D into a first compartment 20 and second compartment 22, each of variable volume.

First passage means 24 are formed in the lower tank half 19 that at all times communicate with the first compartment 20 that is adapted to have purified water P stored therein. Second passage means 26 are formed in the upper half 17 of the tank D and is adapted to have reject water flow into and out of the second compartment 22. An elongate rigid tube E is provided as best seen in FIG. 8 that has an upper angled end 28 and a lower angled end 30, the purpose of which tube will later be explained. The invention A includes an upper assembly F, an intermediate assembly G, and a lower assembly H. All of which are illustrated in FIGS. 1, 3, 4 and 8. The upper assembly F includes a body 32 that has a base portion 32a and an upper portion 32b situated thereabove. The base portion 32a has a tapped centered lower first bore 34 that has a body shoulder 36 projecting inwardly therefrom and a second bore 38 extending upwardly from the body shoulder. The intermediate assembly G as may be seen in FIG. 8 is of tubular configuration and has external threads 40 defined thereon that engage the tapped bore 34. The threads 40 are defined on a tubular member 42 that has an upper circular end surface 42a that is in abutting contact with a sealing ring 44 that abuts against the body shoulder 36. A tube 46 is situated within the interior of the intermediate assembly G, as shown in FIG. 8 and cooperates to define a longitudinal annulus shaped space 48. A reject water discharge line 50 projects outwardly from the intermediate assembly G and communicates with the annulus space 48. A confined space 52 is formed between the base portion 32a and upper portion 32b of the upper assembly F as shown in FIG. 8. A bore 54 is formed in the upper portion 32b and communicates with both the space 52 and a cavity 56 in which reject water may discharge from the upper end 28 of the tubular member to fall downwardly through an air gap 57 into the cavity 56. The upper portion 32b of the upper assembly F has a resilient ring 58 mounted in a recess 60 that sealingly engages the upper exterior end of the tube 46. A transverse passage 66 is formed in the upper portion 32b of the upper assembly A as shown in FIG. 8 and communicates with the interior of the tube 46, with the transverse passage on its outer end developing into an upper passage 68 that has a body shoulder 70 projecting inwardly from the upper body portion 32b, and the lower end 72a of an inverted J-shaped purified water dispensing spout abuts against the body shoulder 70. A groove 74 is formed in the upwardly extending passage 68 above body shoulder 70 and has a resilient ring 76 mounted therein that sealingly engages the exterior surface of the purified water dispensing spout 72.

Figures 1, 2, 5, 6, 7:
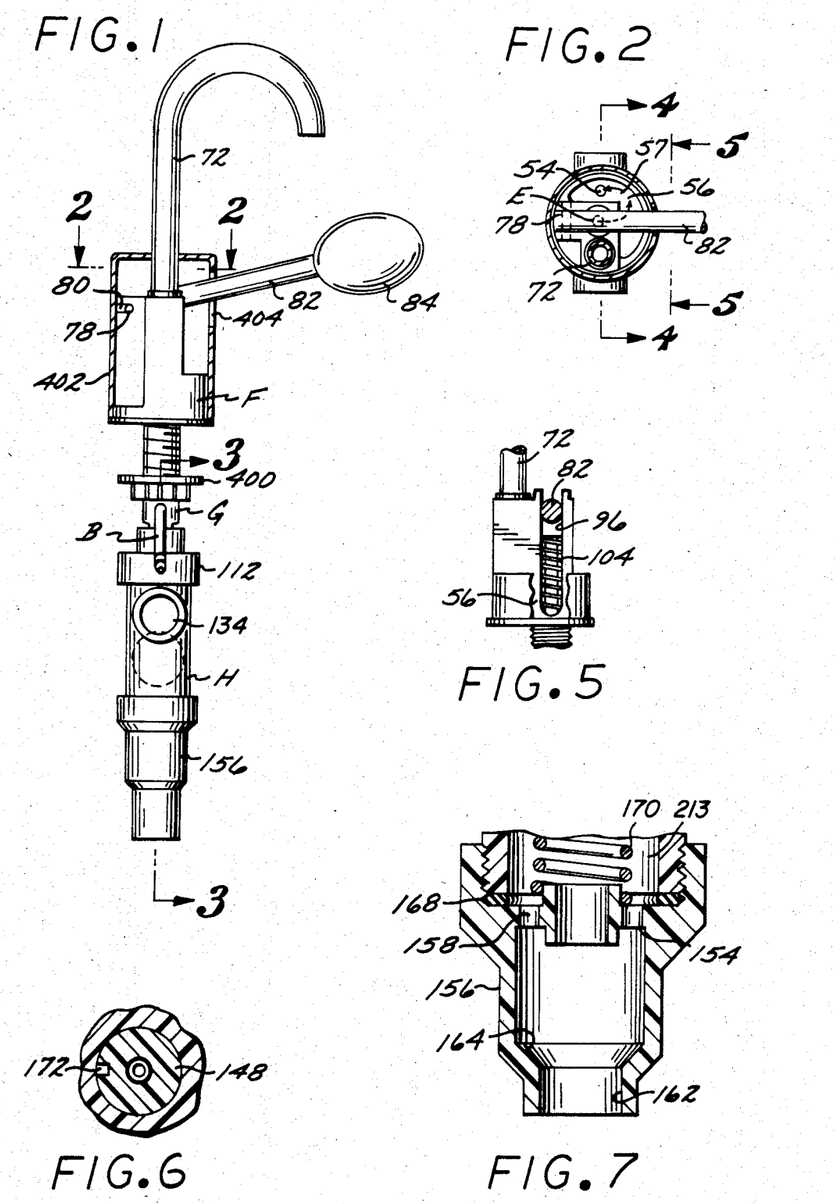
FIG. 1 is a side elevational view of the purified water dispensing and reject water control device.
FIG. 2 is a fragmentary transverse cross sectional view of the device, taken on the line 2—2 of FIG. 1.
FIG. 5 is a side elevational view of an upper portion of the device, taken on the line 5—5 of FIG. 4.
FIG. 6 is a transverse cross sectional view of the device, taken on the line 6—6 of FIG. 3.
FIG. 7 is the same view as shown in FIG. 3, but with the reject water shut off valve having been removed from the lower end cap of the lower assembly of the invention.

In FIG. 1 it will be seen that the upper assembly F includes a transverse groove 80 that has a pin 78 pivotally supported therein, with the pin being secured to an elongate rigid rod 82 that has a handle 84 on the outer end thereof. A bore 88 is formed in the upper portion 32b of the upper assembly A and communicates with the passage 66 with the bore 88 having a first body shoulder 90 defining a portion thereof, from which a bore 92 of larger diameter extends upwardly. The bore 92 developes into a second body shoulder 94 as shown in FIG. 8 that has a vertical space 96 projecting upwardly therefrom in which a rigid block 98 is slidably mounted. The block 98 has a groove 98a in the upper portion thereof and a recess 100 that extends upwardly from the lower end of the block as shown in FIG. 8 and that loosely engages the upper end 28 of the elongate rigid tube E. A resilient ring 102 rests on the body shoulder 90 and is engaged by the lower end of a compressed helical spring 104 that encircles the upper portion of the tube E, and the upper end of the spring being in abutting contact wtih the lower surface of the block 98 to at all times tend to pivot the rod 82 to an upper position as shown in FIG. 1.

The intermediate assembly G is shown in FIG. 8 includes an externally threaded boss that forms a part of the intermediate assembly as shown in FIG. 8, and has a circumferentially extending groove 108 therein in which a resilient ring 110 is partially disposed that is an abutting contact with an upper interior threaded portion 114 of an upper end cap 112. The lower portion 116 of the upper end cap 112 has an upper valve seat 118 defined therein that is engaged by an upper resilient valve member 120 that is securely mounted on the tube E and is in abutting contact with a 122 rigidly secured to the tube. The lower assembly H includes an elongate valve body 124 that has upper threads 126 that engage the tapped interior of the first end cap 112, and the upper end of the tubular valve body 124 sealingly contacting a resilient sealing ring 128 as shown in FIG. 8 that abuts against an interior portion of the upper end cap. The valve body 124 has a transverse partition 130 therein that provides an upper confined space 132 thereabove that is in communication with a purified water inlet 134. A compressed helical spring 136 abuts against the lower end of the upper valve member 120 and at all times forces the valve member and the tube E upwardly. The lower end of the spring 136 abuts against the upper end of a rigid plug 138 that has a cylindrical portion that extends downwardly into a bore 140 that has a ring shaped rib projecting inwardly therein. The rib 142 supports a resilient ring 144 that is compressed into a slidable sealing contact with the exterior surface of the tube E due to the plug 138 being at all times forced downwardly by the compressed helical spring 136. The bore 140 is formed in the body 124 and extends downwardly from the lip 142 to terminate in a lower valve seat 146 that is engaged by a lower valve member 148 that has a convex external surface that has a cavity 150 extending downwardly from the upper center portion, and the cavity having a bottom 150a. The cavity 150 is of somewhat larger diameter than the external diameter of the lower portion of the tube E. The lower portion of the valve body 124 has threads 152 defined thereon that engage internal threads on a lower end cap 156 as shown in FIG. 8. The lower end piece 156 is internally threaded and engages the threads 152 as shown in FIG. 8, the end piece includes a cross member 154 in which ports 158 are defined in the cross member 154, and the cross member supporting a longitudinally extending collar 160. A reject water inlet passage 162 is formed in the lower extremity of the lower end piece 156 and develops into an upwardly and outwardly valve seat 164. The lower end piece 156 in the upper portion thereof defines a circular body shoulder 166 that has a sealing ring 168 supported thereon, that is in abutting contact with the lower extremity of the tubular valve body 124. A compressed helical spring 170 has the lower end thereof in abutting contact with the cross member 154 and the upper end in abutting contact with the lower end of the lower valve member 148, with the spring at all times tending to maintain it in pressure engagement with the lower valve seat 146. The exterior surface of the lower valve member 148 has at least one groove 172 extending upwardly on the exterior surface thereof that cooperates with the valve seat 146 to provide a first flow restrictor. The bore 140 as may be seen in FIG. 8 has a transverse passage 218 formed in the partition 130 that extends outwardly to communicate with a reject water passage 174.

The reverse osmosis module C is illustrated in FIG. 8 as including a cylindrical shell 175 that has an upper end piece 176 and lower end piece 178. The shell 175 has a partition 180 in the upper interior portion thereof that cooperates with the shell and upper end piece 176 to define a confined space 188 that is filled with activated carbon 190 that removes gases such as chlorine and the like from the purified water. The interior of the cylindrical 175 below the partition 180 has a reverse osmosis membrane 182 therein that extends around a tube 184 in which longitudinally spaced perforations 186 are defined. The tube 184 extends upwardly above the partition 180 into the confined space 188 to terminate in an end piece 184a. Perforations 186 are formed in the tube 184 that extends above the partition 180 into the confined space 188. The end piece 176 has an upper purified water discharge tube 14 projecting downwardly into the confined space 188, with the upper tube 14 terminating on the lower end of an end cap 14a. The portion of the tube 14 within the compartment 188 has perforations 186 therein.

A valve V is illustrated in FIG. 8 as being mounted on the upper end 17a of the tank D. The valve V includes a body 192 that has an inlet 194 for pressurized feed water W. The valve body 192 includes a vertically extending bore 196 in which an elongate valve member 198 is disposed. The valve member 198 has an upper end surface 200. The valve member 198 has a lower end 202 as best seen in FIG. 8 that is disposed within the second and upper compartment 22, and has a pressure plate 204 secured thereto. The pressure plate 204 is at all times within the confines of the second compartment 22 of tank D. A transverse feed water discharge passage 208 is formed in the valve body 192 and communicates with the vertical bore 196, and on the outer end is connected to a conduit 209 that extends to a feed water inlet 210 that communicates with the interior of the reverse osmosis shell 175 below the partition 180. The pressure plate 204 has ribs or other stop means 211 on the upper exterior surface thereof that when abutting against the interior surface of the upper end 17b provides a space 207 between the upper surface of the pressure plate 204 and the interior surface of the upper end 17b through which reject water may flow into and out of the upper compartment 22 through the passage 26. The valve member 198 when subjected to the pressure of the feed water may move downwardly from the first position shown in FIG. 8 to a second position (not shown) where the upper end surface 200 is situated below the feed water discharge passage 206. When the pressure plate 204 is not subjected to greater than a predetermined upward force, the pressure of the feed water W on the end surface 200 is sufficient to move the valve member 198 and plate 204 downwardly to the second position where feed water is free to flow through the passage 206 into the conduit 208 which is connected to the feed water inlet 210 of the reverse osmosis module C. As purified water P discharges into the lower first compartment 20 the lower compartment expands to move the barrier 18 upwardly to decrease the volume of the upper second compartment 22, and the barrier upon contacting the pressure plate 204 moving the valve member 198 upwardly with concurrent throttling of the flow of feed water W through the passage 206 as the upper end 200 of the valve member moves towards the first position. When the lower compartment 20 is substantially filled with purified water P, the barrier 18 has physically contacted the pressure plate 204 and advanced the upper end 200 of valve member 198 upwardly towards the first position to the extent that a reduced throttled flow of feed water enters the feed water discharge passage 206 that communicates with the feed water inlet 210 of the reverse osmosis module C.

When the rod 82 and handle 84 is shown in FIG. 1 are in the up position, the upper and lower valve members 118 and 148 are in sealing engagement with the upper and lower valve seats 118 and 146. A portion of the feed water flows through the membrane 182 to enter the perforations 186 as purified water P and discharge from the lower outlet 14 into a conduit 212 that extends to the first passage means 24 and the purified water entering the lower compartment 20. A portion of the purified water P as so generated may flow upwardly through the perforations 186 into the confined space 188 and flow through the activated carbon 190 therein, to enter the upper purified outlet 14 through perforations 186 therein, and flow through a conduit 214 to the purified water inlet 134 in the valve member body 124 of the lower assembly H. The water discharging through the purified water inlet 134 fills the upper confined space 132 but is prevented from flowing upwardly therefrom due to the upper valve member 120 being in sealing engagement with the upper valve seat 118. Reject water discharging from the reverse osmosis module C through the outlet 16 enters a conduit 215 that is in communication with the reject water inlet 162 in the lower end cap 156 as shown in FIG. 8. The reject water may now flow upwardly through the lower end cap and lower confined space 213 and then flow upwardly through the first flow restrictor groove 172 to enter the bore 140 best seen in FIG. 8.

After purified water P has been dispensed initially from first compartment 20, the second compartment 22 will contain reject water. Subsequent discharge or purified water into the first compartment 20 will result in reject water in the second compartment being displaced therefrom. The displaced reject water enters the bore 140 through first restrictor groove 172 to enter the cavity 150 in the lower valve member 148 and flow upwardly through the tubular member E to discharge from the upper end thereof and drop downwardly by gravity through the air gap to the cavity 56 and then through the bore 54, space 52 to enter the intermediate assembly G and discharge through the drain 50.

As the lower compartment 20 fills with purified water P, the barrier 18 will move upwardly and contact the pressure plate 204 to move the valve member 198 upwardly towards the first position and in so doing throttling the rate of the flow of feed water W through the passage 206 to the reverse osmosis module C.

When the handle 84 is pivoted downwardly, a downward force is exerted on the tubular member E to separate the upper and lower valve members 120 and 148 from the upper and lower valve seats 118 and 146. There is now no substantial back pressure on the feed water W entering the reverse osmosis module C, and it flows rapidly therethrough to flush foreign material from the membrane 182 to enter the conduit 215. The initial flow of purified water P from the lower compartment 20, when the valve rod 82 is pivoted downwardly by handle 84, is due to the pressurized water W forcing the valve member 198 and pressure plate 204 downwardly to exert a pressure through the barrier 18 on the purified water P, in the lower compartment 20, to force the same outwardly through the passage 24, conduit 212 to enter the tube 184 and flow through the carbon 190 to enter the upper tube 14 and flow through the conduit 214 to the purified water inlet 134 and then upwardly between the upper valve member 120 and valve seat 118, through the intermediate assembly G to discharge through the passage 66 and passage 68 that communicates with the inverted purified water discharge spout 72. Means (not shown) are provided to prevent the valve member 198 moving downwardly below the second position. Continued discharge of purified water P from the lower compartment 20, after initiation thereof as above described is provided by the reject water discharging rapidly through the reverse osmosis module C, to flow through the conduit 215 to enter the lower assembly H through inlet 162 and flow through the passage 218 and conduit 216 into the upper compartment 22 to increase the volume thereof. Pressure is maintained on purified water P by the reject water so entering the second compartment 22 and a portion thereof entering the cavity in the lower valve member 148 to flow upwardly through the tubular member E that acts as a second flow restrictor, and discharge to the drain 50 as previously described. When the handle 84 is allowed to return to the up position, the upper and lower valve members 120 and 148 will engage upper and lower valve seats 118 and 146. Purified water P now discharges from the reverse osmosis module C through conduit 212 into the lower compartment 20 to increase the volume thereof, and this increase in volume resulting in the reject water in the upper compartment 22 being forced through the passage 26, and conduit 216 to enter the lower assembly H through passage 218 and flow into the cavity 150 in the lower valve member 148, and then upwardly through the tubular member E to discharge through the air gap into the cavity 56 and flow therefrom to the drain line 50. This increase in the volume of the lower compartment 20 by purified water P will continue until the barrier 18 has been moved upwardly to the extent that it pressure contacts the pressure plate 204, to move the valve member 198 upwardly from the second position towards the first position, and throttling the flow of feed water to the reverse osmosis module C.

Figures 3, 4:
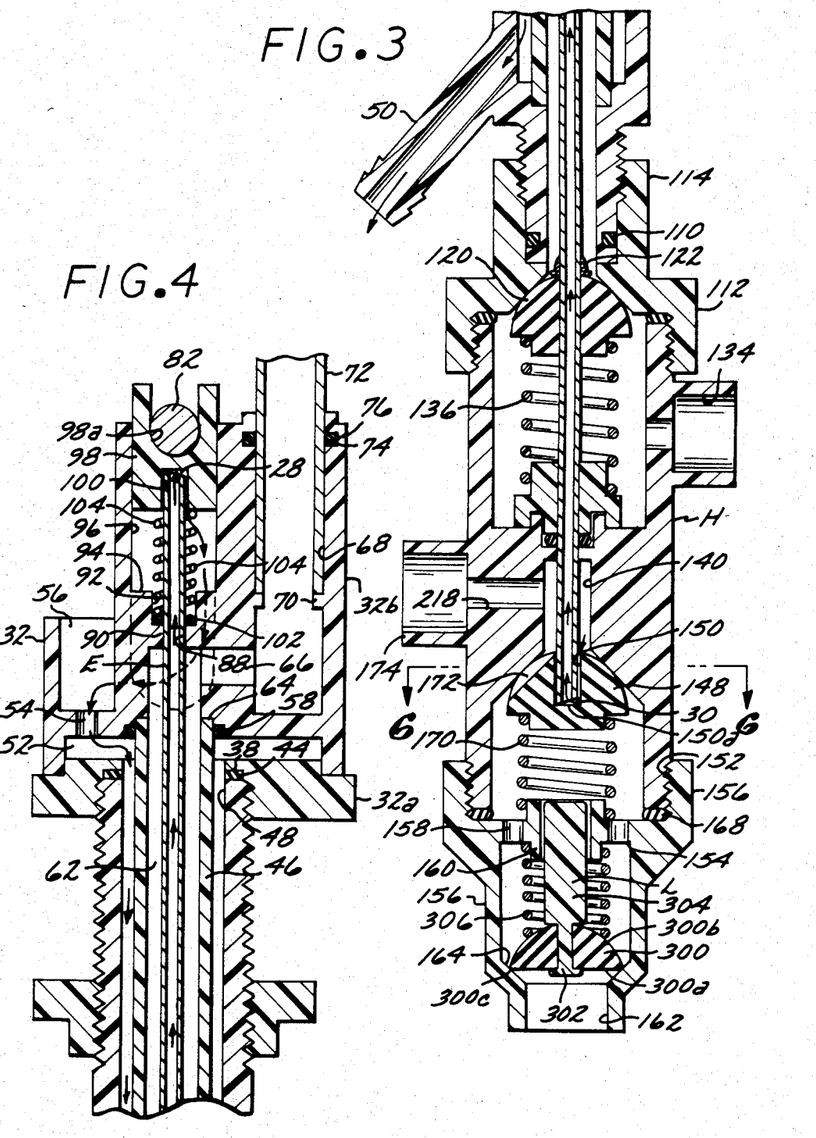
FIG. 3 is an enlarged longitudinal cross sectional view of the device, taken on the line 3—3 of FIG. 1.
FIG. 4 is a longitudinal cross sectional view of the device, taken on the line 4—4 of FIG. 2.

When it is desired to terminate the flow of reject water from the invention after the lower first compartment 20 has been filled with purified water P, a third valve L as shown in FIG. 3 may be inserted in the lower end piece 156. The valve L includes a reject water resilient valve member 300 that has a lower flat surface 300a, an upper convex surface 300b, with the two above mentioned surfaces defining a circular edge 300c, that is in a pressure contact with the valve seat 164 as shown in FIG. 3. A pin 302 extends through the center of the valve member 300 and is connected to an elongate rigid member 304 of smaller transverse cross section than that of the collar 160 in which it is slidably mounted. A compressed helical spring 306 bears against the cross member 154 as shown in FIG. 3 and against the upper convex surface 300b to maintain the valve member in sealing contact with the seat 164.

When the valve V is in the second position, the reject water flows from the reverse osmosis module C through the conduit 216 in sufficient volume and pressure as to move the valve member 300 upwardly, to permit reject water to flow upwardly through the passages 158 and then through the first flow restrictor 172 into the bore 140 to enter cavity 150 and flow upwardly through tubular member E to the drain line 50 as previously described. As the purified water P increases the lower compartment 20 in volume, the barrier 18 pressure contacts the pressure plate 204 to move the valve member 198 upwardly from the second towards the first position, and in so doing throttling the flow of feed water W to the reverse osmosis module C. The throttled rate of flow of feed water W to the reverse osmosis module C results in a throttled rate of flow of reject water at a reduced pressure through the conduit 215 to the inlet 162 which is not sufficient to overcome the force exerted by compressed spring 306 on valve member 300. Valve L as a result thereof assumes the closed position shown in FIG. 3 and no reject water discharges to the drain line 50 after the lower compartment 20 is substantially filled with purified water W. This condition will prevail until the handle 84 is moved downwardly to upset the equilibrium established in the invention between the purified water in the lower compartment 20, the force exerted by the feed water W on the upper end surface 200 of the valve member 198, and the force required to be exerted on the lower end of the valve member 300 to move it upwardly against the compression of the spring 306 to separate the edge 300c from the valve seat 164.

In FIG. 8 it will be seen that the intermediate assembly G is removably supported by a nut 400 that engages the threads 40 and bears against the underside of drain board B. In FIG. 1 it will be seen that an inverted cup shaped housing 402 may be provided that slidably and removably engages the portion 32a to conceal the upper assembly F, which housing has a slot 404 therein through which the rod 82 extends.

The components of the invention A previously described may be injection molded from a suitable polymerized resin. Due to the throttling action of the valve V as the latter moves towards the first position, a substantially less quantity of reject water discharges to the drain from the invention A than in prior art reverse osmosis assemblies. The surface area of the pressure plate 204 is so related to the upper end 200 of the valve member 198 that the valve member will start to move towards the first position when but a force of between 2 to 5 pounds pressure per square inch is exerted on the pressure plate 204. This limits the stress to which the interior of tank D is subjected.

From the previous description it will be seen that but a small transverse bore 10 need be formed in the drain board in which the intermediate assembly G is disposed, with this assembly including passage means for the upward flow of reject water therein, the downward flow of reject water after the latter has dripped downwardly through an air gap in the upper assembly F and then discharges to the drain, as well as the intermediate assembly including a passage for the upward flow of purified water to the upper assembly.

The upward flow of reject water through the intermediate assembly is through the tube E which has a small bore and acts not only as a second flow restrictor but as an actuator to move the upper and lower valve members 120 and 148 relative to upper and lower valve seats 118 and 146. The lower valve member also serves as a first flow restrictor. All of the above functions are carried out by a single multi-piece purified water dispensing assembly A.

The use and operation of the invention has been described previously in detail and need not be repeated. It will be apparent from the prior description, that the invention A may be used to generate purified water with reject water continuously flowing through the membrane 182 to maintain it in a moist condition, or the invention by use of the valve L may be modified to terminate the flow of reject water after the lower compartment 20 has been substantially filled with purified water P.

What is claimed is:

1. In combination with a pressurized feed water supplied reverse osmosis cartridge that has a purified water outlet and a reject water outlet; a tank that has a movable barrier therein that subdivides an interior of said tank into first and second compartments of variable volume and that are in communication with, a purified water passage and a reject water passage defined in said tank, said purified water passage in communication with said purified water outlet; a purified water dispensing and reject water control device, said control device including:

(a) an elongated vertical valve body that has upper and lower ends and a hollow interior defined in part by means defining upper and lower confined spaces that include upper and lower valve seats and said valve body including a purified water inlet in communication with said upper confined space and said purified water passage; a reject water inlet in communication with said reject water outlet; said reject water passage in communication with said lower confined space and said second compartment; said elongate valve body having formed therein a reject water receiving cavity adjacent said upper end of said valve body; a reject water drain outlet situated below said cavity;

(b) first and second valve members which when in first positions seal with said upper and lower valve seats, said second valve member including a first water flow restrictor through which reject water may flow upwardly from said lower confined space when said second valve member is in said first position;

(c) first means that tend to maintain said first and second valve members in said first position;

(d) a tube and elongate tubular member longitudinally, and concentrically disposed in said valve body, said tube disposed in a fixed position in said valve body, said tubular member having an upper end disposed above said reject water receiving cavity and a lower end within said lower confined space, said elongate tubular member, longitudinally movable relative to said tube, said tubular member having a first elongate passage therein of sufficiently small transverse cross section as to serve as a second reject water flow restrictor, said tubular member and tube cooperating to define a second passage therebetween that is in communication with said upper valve seat and a purified water dispensing outlet in said upper end of said valve body, and said tube and a portion of said valve body most adjacent thereto cooperating to define a third passage that is in communication with said reject water receiving cavity and said reject water drain outlet, said elongate member so operatively associated with said first and second valve members that said first and second valve members are moved to second positions when said elongate member is moved downwardly from a first to a second position relative to said tube, said second valve member when in said second position permitting reject water entering said lower confined space to by-pass said first flow restrictor and substantially by-pass said second flow restrictor to flow through said reject water passage to said second compartment to expand said second compartment and force purified water in said first compartment to flow therefrom through said purified water passage, purified water inlet, and second passage to discharge through said purified water dispensing outlet so long as said first and second valve members are in said second positions, with flow of purified water from said purified water dispensing outlet and flow of reject water to said second compartment terminating when said first and second valve members return to said first positions, with purified water from said purified water outlet thereafter flowing to said first compartment to expand said first compartment and force reject water in said second compartment therefrom to flow into said reject water passage, into said valve body to enter said second flow restrictor and drop by gravity from said upper end of said tubular member through an air gap into said reject water receiving cavity, and reject water from said reject water outlet entering said lower confined space to flow sequentially through said first and second reject water flow restrictors to said reject water receiving cavity for subsequent flow to said reject water drain outlet.

2. A purified water dispensing and reject water control device in combination as defined in claim 1 in which said first means are first and second springs disposed in said upper and lower confined spaces that are in abutting contact with said first and second valve members.

3. A purified water dispensing and reject water control device in combination as defined in claim 2 in which said second valve member has a downwardly extending recess therein that has a bottom and into which recess, reject water that has flowed through said first restrictor can flow, with said bottom defined by a portion of said second valve member, said elongate tubular member extending loosely into said recess for said lower end of said elongate tubular member to abut against said bottom, and said first spring tending to maintain said first valve member and said elongate tubular member in said first positions.

4. A purified water dispensing and reject water control device in combination as defined in claim 1 in which said valve body includes a transverse partition that serves to separate said upper and lower confined spaces, said partition having a longitudinal first bore therein that extends upwardly from said lower valve seat and is in communication with said reject water passage, said first valve member having a longitudinal second bore therein, said elongate tubular member extending downwardly through said second and first bores to loosely engage a recess that extends downwardly in said second valve member, said second valve member being moved to a second position by movement of said elongate tubular member to a second position, and said control device further including:

(e) stop means on said elongate tubular member above said first valve member that contact said first valve member and move said first valve member from said first towards said second position when said elongate tubular member and second valve member start to move to said second position, with said second and first valve members sequentially assuming first positions as said elongate tubular member moves towards a first position.

5. A purified water dispensing and reject water control device in combination as defined in claim 4 in which said first means are first and second springs disposed in said upper and lower confined spaces and are in abutting contact with said first and second valve members, with said first spring serving to maintain said first valve member in said first position.

6. A purified water dispensing and reject water control device in combination as defined in claim 5 in which in addition includes:

(f) handle means above and connected to said valve body for moving said elongate tubular member from a first to second position.

7. A purified water dispensing and reject water control device in combination as defined in claim 6 which in addition includes:

(g) tubular means in communication with said purified water dispensing outlet for dispensing purified water at an elevated position above said upper end of said valve body.

* * * * *